United States Patent
Chiba et al.

(10) Patent No.: US 12,441,339 B2
(45) Date of Patent: Oct. 14, 2025

(54) LOAD AND UNLOAD SUPPORT DEVICE AND LOAD AND UNLOAD SUPPORT

(71) Applicant: TOYOTA JIDOSHA KABUSHIKI KAISHA, Toyota (JP)

(72) Inventors: Hiroya Chiba, Fuji (JP); Tatsuya Sugano, Sunto-gun Shizuoka-ken (JP); Rika Oike, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 18/522,781

(22) Filed: Nov. 29, 2023

(65) Prior Publication Data

US 2024/0217525 A1    Jul. 4, 2024

(30) Foreign Application Priority Data

Dec. 28, 2022    (JP) .................. 2022-211140

(51) Int. Cl.
| | |
|---|---|
| *B60W 50/02* | (2012.01) |
| *B60W 30/06* | (2006.01) |
| *B60W 50/00* | (2006.01) |
| *B60W 50/14* | (2020.01) |

(52) U.S. Cl.
CPC ........ *B60W 50/0205* (2013.01); *B60W 30/06* (2013.01); *B60W 2050/0002* (2013.01); *B60W 2050/143* (2013.01)

(58) Field of Classification Search
None
See application file for complete search history.

(56) References Cited

U.S. PATENT DOCUMENTS

2018/0261092 A1    9/2018    Tsuyunashi
2020/0365026 A1*   11/2020   Noguchi ............ G01C 21/3407

FOREIGN PATENT DOCUMENTS

| JP | 5446998 B2 | 3/2014 |
| JP | 2018-151858 A | 9/2018 |
| JP | 6826835 B2 * | 2/2021 |
| JP | 2021056819 A * | 4/2021 |

OTHER PUBLICATIONS

English Machine Translation of JP6826835B2 (Year: 2021).*
English Machine Translation of JP2021056819A (Year: 2021).*

* cited by examiner

*Primary Examiner* — Jason Holloway
*Assistant Examiner* — Atticus A Cameron
(74) *Attorney, Agent, or Firm* — Dinsmore & Shohl LLP

(57) ABSTRACT

A load and unload support device includes an information processing unit for communicating with a user terminal of a first vehicle and a control terminal of a second vehicle. When the second vehicle is parked between an entrance/exit of a parallel parking lot connected to a road and the first vehicle, the information processing unit transmits a temporary unload instruction for the second vehicle that is received from the user terminal to the control terminal. When receiving the load instruction for the second vehicle from the user terminal subsequent to a receipt of the temporary unload instruction, the information processing unit transmits the load instruction for the second vehicle to the control terminal. When a predetermined time elapses after the receipt of the temporary unload instruction without receiving the load instruction for the second vehicle, information processing unit transmits an alert notification to the user terminal.

5 Claims, 6 Drawing Sheets

LOAD AND UNLOAD SUPPORT DEVICE AND LOAD AND UNLOAD SUPPORT

CROSS-REFERENCE TO RELATED APPLICATION

The present application claims priority under 35 U.S.C. § 119 to Japanese Patent Application No. 2022-211140, filed on Dec. 28, 2022, the contents of which application are incorporated herein by reference in their entirety.

BACKGROUND

Technical Field

The present disclosure relates to a device and a method for supporting a load and unload of an automatic parking vehicle.

Background Art

JP 5446998 B2 discloses a technique to manage two vehicles parked in a parking lot. In the related art, to unload a first vehicle from the parking lot, an instruction is transmitted to a second vehicle to perform a temporal unload from a parking space, and then an instruction is transmitted to the second vehicle to return to the parking space after the first vehicle has left the parking lot. In the related art, the instruction for the second vehicle to perform the temporal unload and the instruction for the second vehicle to return the parking lot are transmitted from a key to the second vehicle.

SUMMARY

However, if a user of first vehicle forgets to give the instruction for the second vehicle to return the parking lot, the second vehicle may remain on a road and interfere with a traffic of vehicles traveling on the road.

An object of the present disclosure is to provide a technique capable of avoiding a state in which a second vehicle that performs a temporal unload from a parking lot remains on a road after an unload of a first vehicle from the parking lot.

A first aspect relates to a load and unload support device for a first vehicle and a second vehicle parked in a parallel parking lot facing a road. The load and unload support device includes information processing unit for communicating with a user terminal of the first vehicle and a control terminal of the second vehicle. At least the second vehicle is a vehicle with automatic load and unload function. When the second vehicle is parked between an entrance/exit of the parallel parking lot connected to the road and the first vehicle, the information processing unit transmits a temporary unload instruction for the second vehicle that is received from the user terminal to the control terminal. When receiving a load instruction for the second vehicle from the user terminal subsequent to a receipt of the temporary unload instruction, the information processing unit transmits the load instruction for the second vehicle to the control terminal. When a predetermined time elapses after the receipt of the temporary unload instruction without receiving the load instruction for the second vehicle, the information processing unit transmits an alert notification to the user terminal.

A second aspect relates to a load and unload support method for a first vehicle and a second vehicle parked in a parallel parking lot facing a road. At least the second vehicle is a vehicle with automatic load and unload function. The load and unload support method includes:

when the second vehicle is parked between an entrance/exit of the parallel parking lot connected to the road and the first vehicle, transmitting a temporary unload instruction for the second vehicle that is received from a user terminal of the first vehicle to a control terminal of the second vehicle;

when receiving a load instruction for the second vehicle from the user terminal subsequent to a receipt of the temporary unload instruction, transmitting the load instruction for the second vehicle to the control terminal; and when a predetermined time elapses after the receipt of the temporary unload instruction without receiving the load instruction for the second vehicle, transmitting an alert notification to the user terminal.

According to the present disclosure, when the predetermined time elapses after the receipt of the temporary unload instruction without receiving the load instruction for the second vehicle, the alert notification is transmitted to the user terminal. According to the alert notification, the user of the first vehicle can be made aware that the load instruction for the second vehicle that has temporarily left the parallel parking lot has not been transmitted from the user terminal, thus avoiding the second vehicle being left unattended on the road facing the parallel parking lot.

DESCRIPTION OF EMBODIMENT

A load and unload support device and a load and unload support method according to an embodiment of the present disclosure will be described with reference to the appended drawings.

1. First Embodiment

1-1. Outline

Figure 1:
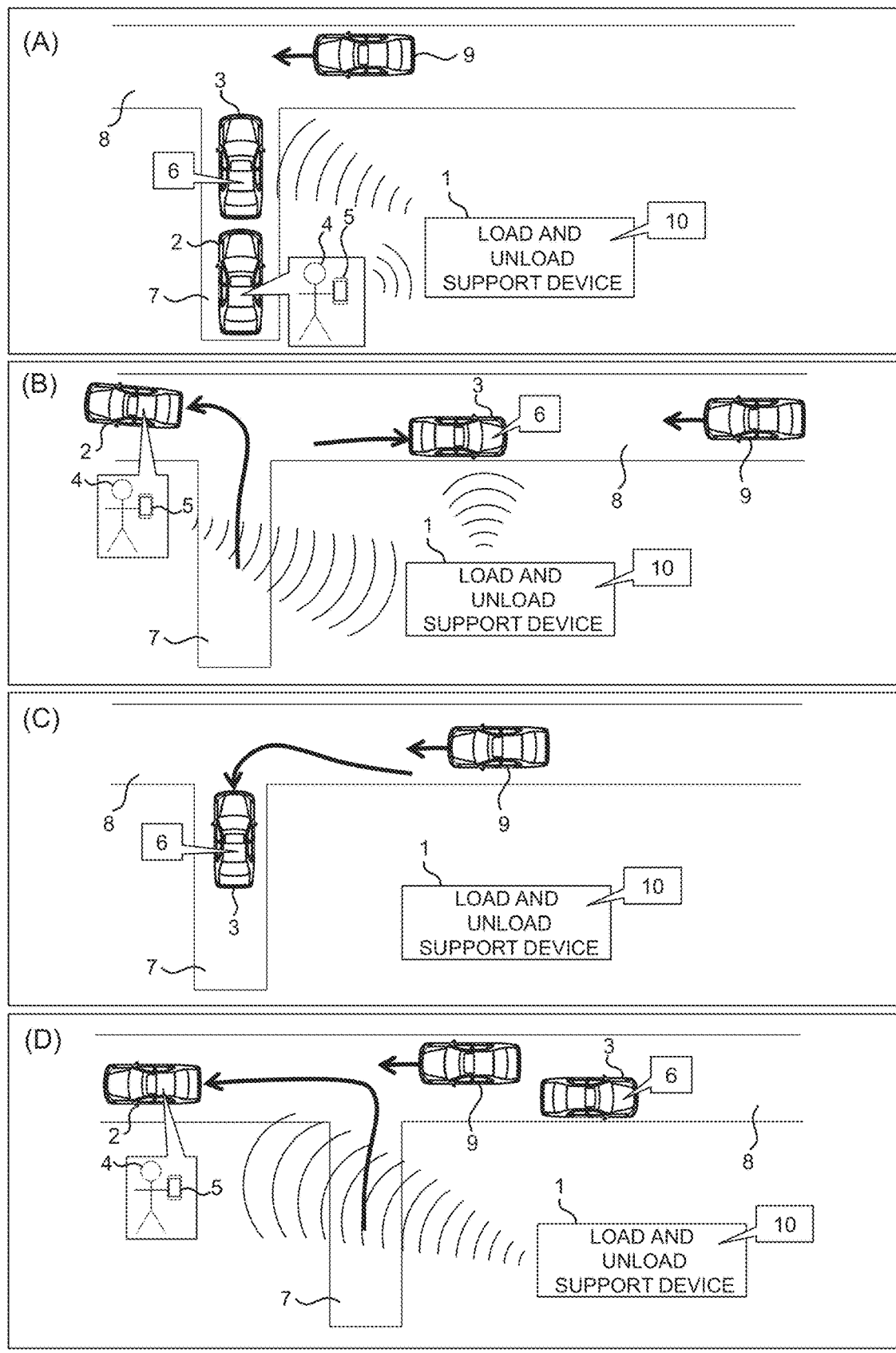
FIG. 1 is a diagram for explaining an outline and a specific example of a load and unload support device according to a first embodiment.

FIG. 1 is a diagram for explaining an outline and a specific example of a load and unload support device 1 according to a first embodiment. The load and unload support device 1 is a device that supports load/unload of a vehicle that is parallel parked in a parallel parking lot 7 (hereinafter referred to as a parking lot 7) facing a road 8 on which a general vehicle 9 travels. The vehicles parked in parallel in the parking lot 7 include at least one host vehicle (hereinafter referred to as a first vehicle 2) and at least one other vehicle (hereinafter referred to as a second vehicle 3). The first vehicle 2 may be an automatic driving vehicle, a manual driving vehicle, or a vehicle having an automatic load and unload function. The second vehicle 3 is a vehicle having an automatic load and unload function. The vehicle having the automatic load and unload function is, for example, an automated valet parking (AVP) vehicle or the like.

Here, as shown in the case (A) of FIG. 1, a case where the second vehicle 3 is parked between an entrance of the parking lot 7 connected to the road 8 and the first vehicle 2 is considered. In this case, when unloading the first vehicle 2, it is necessary to temporarily unload the second vehicle 3 on the road 8. Therefore, according to the load and unload support device 1, when the first vehicle 2 is to be unloaded from the parking lot 7, a temporary unload instruction is given to the second vehicle 3. Hereinafter, a specific example of the load and unload support device 1 according to the first embodiment will be described.

1-2. Specific Example

As shown in case (A) of FIG. 1, the load and unload support device 1 includes an information processing unit 10. The information processing unit 10 includes a processor and a storage device. The processor executes various processes. For example, the processor includes a central processing unit (CPU). The storage device stores various types of information. Examples of the storage device include a volatile memory, a non-volatile memory, a hard disk drive (HDD), and a solid state drive (SSD). The storage device stores a load and unload support program and the like. The load and unload support program is a computer program for supporting load/unload of the first vehicle 2 parallel-parked in the parking lot 7. Various processes by the information processing unit 10 are realized by the processor executing the load and unload support program. The load and unload support program may be recorded in a recording medium readable by the information processing unit 10.

The Information processing unit 10 includes a communication device capable of communicating with a user terminal 5 of a user 4 who uses first vehicle 2 and a control terminal 6 provided in second vehicle 3. The user 4 includes a driver, an occupant other than the driver, and the like. Examples of the user terminal 5 include a smartphone and a display mounted on the first vehicle 2. Examples of the control terminal 6 include an electronic control unit (ECU) and the like.

As illustrated in the case (A) of FIG. 1, when the information processing unit 10 receives the temporary unload instruction of the second vehicle 3 from the user terminal 5, the information processing unit 10 transmits the temporary unload instruction to the control terminal 6. Thereafter, as illustrated in the case (B) of FIG. 1, when the information processing unit 10 receives, from the user terminal 5, a load instruction for causing the second vehicle 3 that has temporarily unloaded to reload the parking lot 7, the information processing unit 10 transmits the load instruction to the control terminal 6. Then, as shown in the case (C) of FIG. 1, the second vehicle 3 is reloaded into the parking lot 7 in accordance with the load instruction.

Here, in the case (B) of FIG. 1, a case where the load instruction of the second vehicle 3 is not transmitted from the user terminal 5 to the information processing unit 10 is considered. In this case, the information processing unit 10 does not transmit the load instruction for the second vehicle 3 to the control terminal 6. As a result, the second vehicle 3 is not reloaded into the parking lot 7, and the second vehicle 3 remains on the road 8. This may obstruct the passage of the general vehicle 9 traveling on the road 8. Therefore, when a predetermined time elapses after a receipt of the temporary unload instruction without receiving the load instruction for the second vehicle 3, the information processing unit 10 transmits an alert notification to the user terminal 5 as illustrated in the case. The alert notification is, for example, a notification that urges the user 4 of the first vehicle 2 who forgot to reload the second vehicle 3 after unloading the first vehicle 2 to reload the second vehicle 3.

As described above, according to the load and unload support device 1 of the first embodiment, when receiving the load instruction for the second vehicle 3 from the user terminal 5 subsequent to the receipt of the temporary unload instruction, the load instruction for the second vehicle 3 is transmitted to the control terminal 6. In addition, according to the load and unload support device 1 of the first embodiment, when the predetermined time elapses after the receipt of the temporary unload instruction without receiving the load instruction for the second vehicle 3, the alert notification is transmitted to the user terminal 5. According to the alert notification, it is possible to make the user 4 of the first vehicle 2 aware that the load instruction for the second vehicle 3 that has temporarily unloaded for unload of the first vehicle 2 is not transmitted from the user terminal 5. Therefore, it is possible to avoid a state in which the second vehicle 3 remains on the road 8 facing the parking lot 7. Therefore, the obstruction to the passage of the general vehicle 9 traveling on the road 8 is eliminated.

1-3. Processing Example

Figure 2:
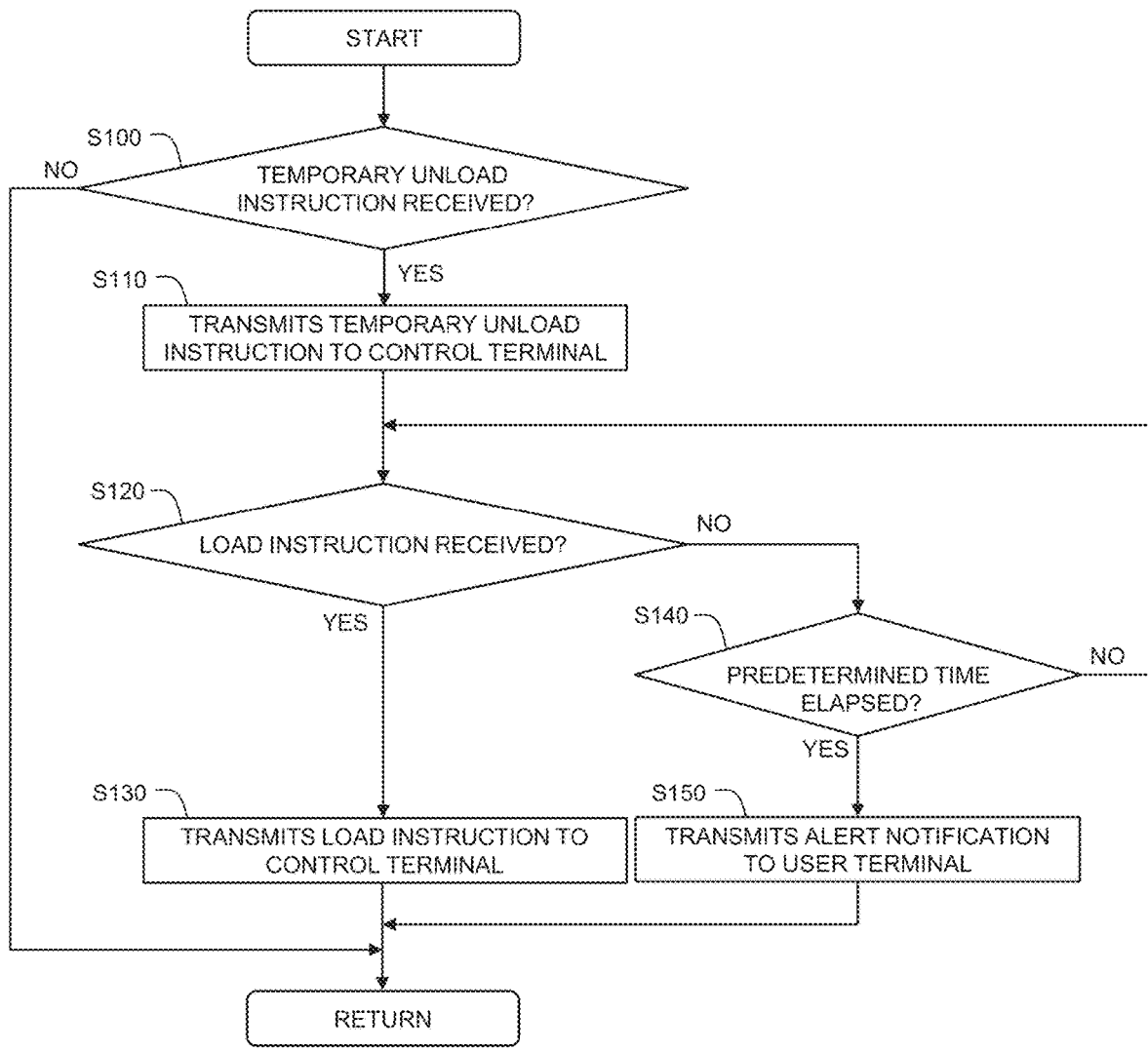
FIG. 2 is a flowchart illustrating a process example of the load and unload support device according to the first embodiment.

FIG. 2 is a flowchart illustrating a process example of the information processing unit 10 in the load and unload support device 1 according to the first embodiment.

In step S100, the information processing unit 10 determines whether or not the temporary unload instruction for the second vehicle 3 is received. When it is determined that the temporary unload instruction for the second vehicle 3 is received (step S100; Yes), the processing proceeds to step S110. Otherwise (step S100; No), the processing is terminated.

In step S110, the information processing unit 10 transmits the temporary unload instruction for the second vehicle 3 to the control device 6. Thereafter, the process proceeds to step S120.

In step S120, the information processing unit 10 determines whether or not the load instruction for the second vehicle 3 has been received. If it is determined that the load instruction for the second vehicle 3 has been received (step S120; Yes), the process proceeds to step S130. Otherwise (step S120; No), the process proceeds to step S140.

In step S130, the information processing unit 10 transmits the load instruction for the second vehicle 3 to the control device 6.

In step S140, the information processing unit 10 determines whether or not a predetermined time has elapsed since the temporary unload instruction was received. When it is determined that the predetermined time has elapsed since the temporary unload instruction is received (step S140; Yes), the process proceeds to step S150. Otherwise (step S140; No), the processing returns to step S120.

In step S150, the information processing unit 10 transmits the alert notification to the user terminals 5.

1-4. Modification Example

1-4-1. First Example

The above-described temporary unload instruction for the second vehicle 3 may include an information on a stop position on the road 8 where the second vehicle 3 will temporarily unload. For example, the stop position of the road 8 where the second vehicle 3 temporarily unloads may be a shoulder of the road three meters from the entrance/exit of the parking lot 7. Thus, it is possible to prevent the second vehicle 3 from stopping at the center of the road 8. Therefore, the obstruction to the passage of the general vehicle 9 traveling on the road 8 is eliminated.

1-4-2. Second Example

The load instruction for the second vehicle 3 described above may include an information on the load position in the parking lot 7. For example, in a case where there are two parking positions on the entrance side and the back side of the parking lot 7 as the parking positions of the parking lot 7 where two vehicles can be parked, the load instruction for the second vehicle 3 may set the load position of the second vehicle 3 to the back side of the parking lot 7. As a result, when the first vehicle 2 loads, the first vehicle 2 loads without temporarily unloading the second vehicle 3. Therefore, it is possible to reduce the time required for the first vehicle 2 to load the parking lot 7. Therefore, when the first vehicle 2 loads the parking lot 7, the first vehicle 2 does not obstruct the passage of the general vehicle 9 traveling on the road 8.

2. Second Embodiment

In the load and unload support device 1 according to the first embodiment, when the predetermined time elapses after the receipt of the temporary unload instruction without receiving the load instruction for the second vehicle 3, the alert notification is transmitted to the user terminal 5. However, it is assumed that the load and unload support device 1 does not receive a load instruction for the second vehicle 3 from the user terminal 5 after transmitting the alert notification to the user terminal 5. In this case, the second vehicle 3 remains on the road 8 and may obstruct traffic to the general vehicle 9 traveling on the road 8.

Therefore, according to a load and unload support device 1 of a second embodiment, when the predetermined time elapses after transmitting the alert notification to the user terminal 5 without receiving the load instruction for the second vehicle 3 from the user terminal 5, a forced load instruction for the second vehicle 3 is transmitted to the control terminal 6. Thus, it is possible to avoid a state in which the second vehicle 3 remains on the road 8. Therefore, the obstruction to the passage of the general vehicle 9 traveling on the road 8 is eliminated. Hereinafter, details of a processing example of the information processing unit 10 in the load and unload support device 1 according to the second embodiment will be described.

Figure 3:
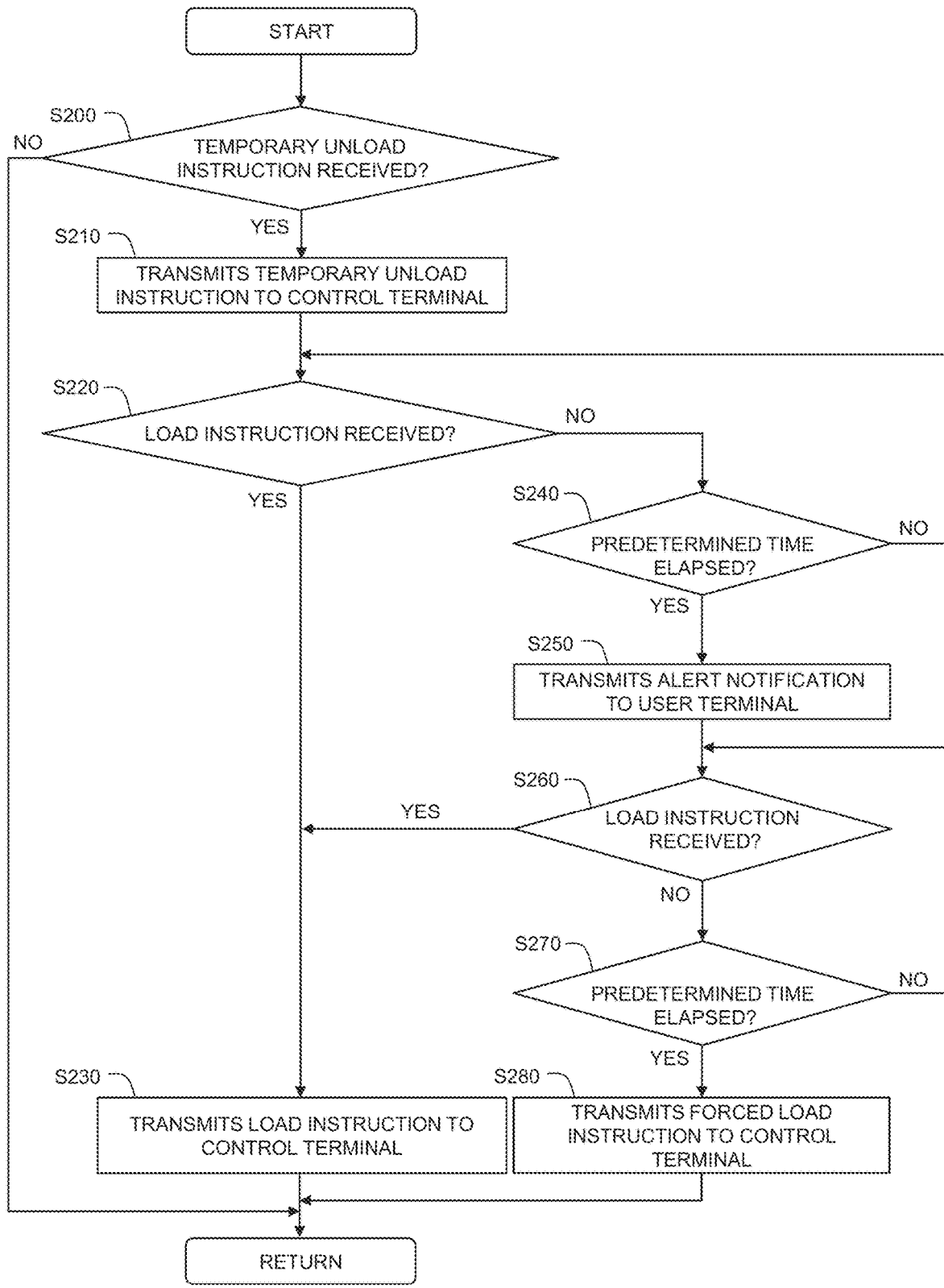
FIG. 3 is a flowchart illustrating a process example of a load and unload support device according to a second embodiment.

FIG. 3 is a flowchart illustrating a process example of the information processing unit 10 in the load and unload support device 1 according to the second embodiment.

In step S200, the information processing unit 10 determines whether or not the temporary unload instruction for the second vehicle 3 is received. When it is determined that the temporary unload instruction for the second vehicle 3 is received (step S200; Yes), the processing proceeds to step S210. Otherwise (step S200; No), the processing is terminated.

In step S210, the information processing unit 10 transmits the temporary unload instruction for the second vehicle 3 to the control device 6. Thereafter, the process proceeds to step S220.

In step S220, the information processing unit 10 determines whether or not the load instruction for the second vehicle 3 has been received. If it is determined that the load instruction for the second vehicle 3 has been received (step S220; Yes), the process proceeds to step S230. Otherwise (step S220; No), the process proceeds to step S240.

In step S230, the information processing unit 10 transmits the load instruction for the second vehicle 3 to the control device 6.

In Step S240, the information processing unit 10 determines whether or not the predetermined time has elapsed since the receipt of the temporary unload instruction. When it is determined that the predetermined time has elapsed (Yes at Step S240), the process proceeds to Step S250. Otherwise (step S240; No), the processing returns to step S220.

In step S250, the information processing 10 transmits the alert notification to the user terminals 5. Thereafter, the process proceeds to step S260.

In step S260, the information processor 10 determines whether or not a load instruction for the second vehicle 3 has been received. If it is determined that the load instruction for the second load 3 has been received (step S260; Yes), the process proceeds to step S230. Otherwise (step S260; No), the process proceeds to step S270.

In step S270, the information processor 10 determines whether or not a predetermined time has elapsed since the temporary unload instruction was received. When it is determined that the predetermined time has elapsed since the temporary unload instruction is received (step S270; Yes), the process proceeds to step S280. Otherwise (step S270; No), the processing returns to step S260.

In step S280, the information processing unit 10 transmits the forced load instruction of the second vehicle 3 to the control device 6.

3. Third Embodiment

Here, a congestion situation of the road 8 from which the second vehicle 3 temporarily unloads will be considered. It is assumed that the road 8 is congested depending on a time zone in which the first vehicle 2 unloads the vehicle. When the time from the temporary unload for the second vehicle 3 to the reloading of the second vehicle 3 is long, there is a concern that the second vehicle 3 may obstruct the passage of the general vehicle 9. Therefore, it is necessary to shorten the time from the temporary loading for the second vehicle 3 to the reloading of the second vehicle 3. According to a load and unload support device 1 of the third embodiment, when the second vehicle 3 temporarily unloads the parking lot and surroundings of the second vehicle 3 are congested, another alert notification is transmitted to the user terminal 5 before the alert notification is transmitted to the user terminal 5. Hereinafter, a specific example of the load and unload support device 1 according to the third embodiment will be described.

Figure 4:
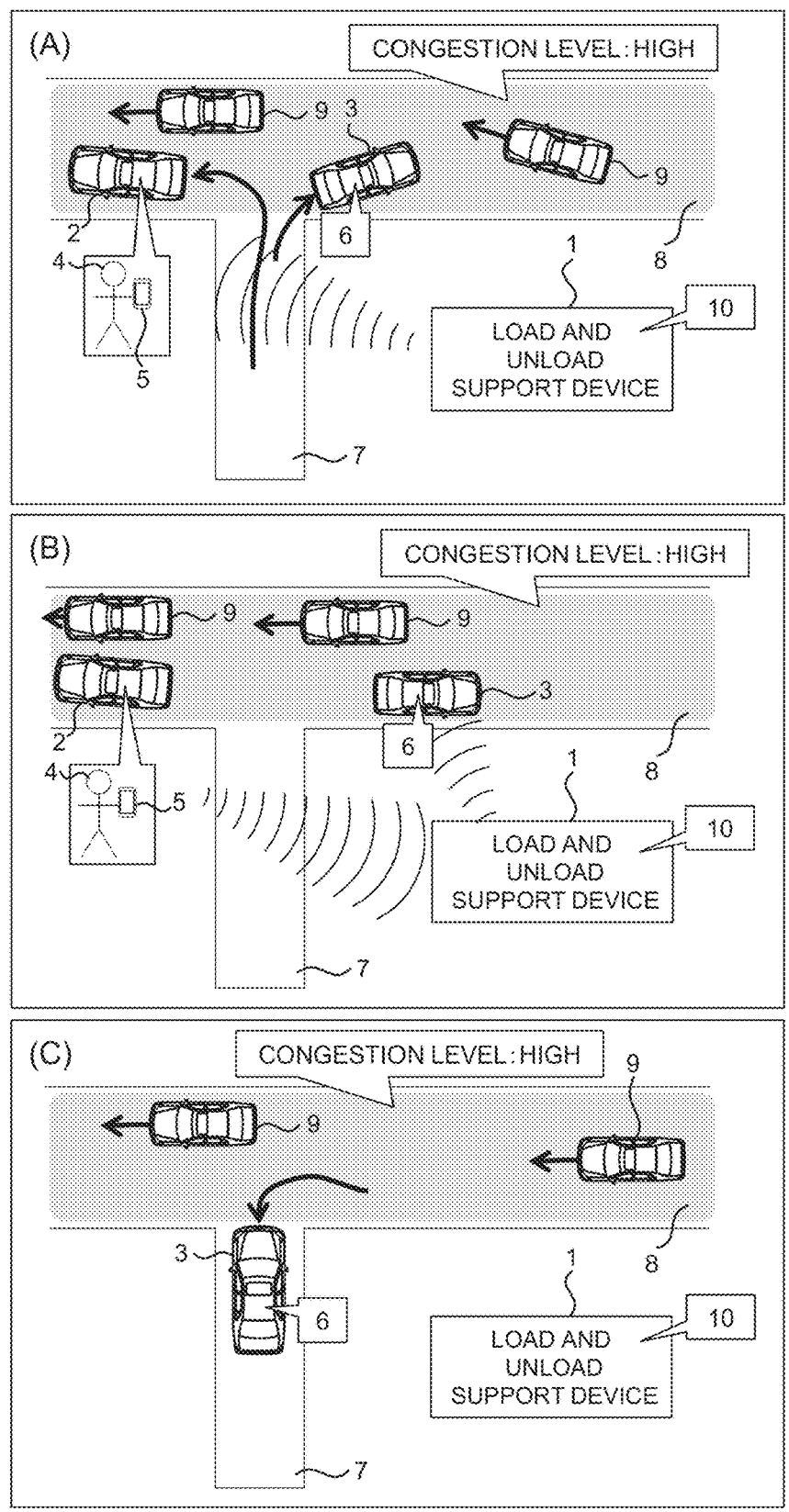
FIG. 4 is a diagram illustrating a specific example of a load and unload support device according to a third embodiment.

FIG. 4 is a diagram illustrating a specific example of the load and unload support device 1 according to the third embodiment. As illustrated in case (A) of FIG. 4, when the surroundings of the second vehicle 3 are congested, the load and unload support device 1 transmits the other alert notification to the user terminal 5. Specifically, when a congestion level indicating a congestion state of the road 8 from which the second vehicle 3 temporarily unloads is equal to or higher than a predetermined level, that is, when the congestion level of the road 8 is high, the load and unload support device 1 transmits the other alert notification to the user terminal 5. The congestion level of the road 8 may be classified based on the number of general vehicles 9 around the second vehicle 3, for example. The number of general vehicles 9 may be recognized based on a camera image acquired by a camera mounted on the second vehicle 3 or may be recognized based on an infrastructure camera image acquired by an infrastructure camera installed near the parking lot 7. The other alert notification is, for example, a notification for alerting the user 4 of the first vehicle 2 to reload the second vehicle 3 because the surroundings of the second vehicle 3 are congested. Examples of a notification device include a speaker, a light, and the like.

Thereafter, as shown in the case (B) of FIG. 4, when receiving from the user terminal 5 load instruction to reload the parking lot 7 the second vehicle 3 that has been temporarily unloaded, the load and unload support device 1 transmits the load instruction to the control terminal 6. Then, as shown in case (C) of FIG. 4, the second vehicle 3 reloads the parking lot 7 in accordance with the load instruction.

In case (B) of FIG. 1, it is assumed that the load instruction for the second vehicle 3 is not transmitted from the user terminal 5 to the load and unload support device 1. Therefore, when the predetermined time elapses after the receipt of the temporary unload instruction without receiving the load instruction for the second vehicle 3, the load and unload support device 1 transmits the alert notification to the user terminal 5.

As described above, according to the load and unload support device 1 of the third embodiment, when the second vehicle 3 temporarily unloads the parking lot and the surroundings of the second vehicle 3 are congested, the other alert notification is transmitted to the user terminal 5 before the alert notification is transmitted to the user terminal 5. Thus, the time from the temporary unloading of the second vehicle 3 to the reloading of the second vehicle 3 is shortened. Therefore, the obstruction to the passage of the general vehicle 9 traveling on the road 8 is eliminated. Hereinafter, a detailed description will be given of a processing example of the information processing unit 10 in the load and unload support device 1 according to the third embodiment will be described.

Figure 5:
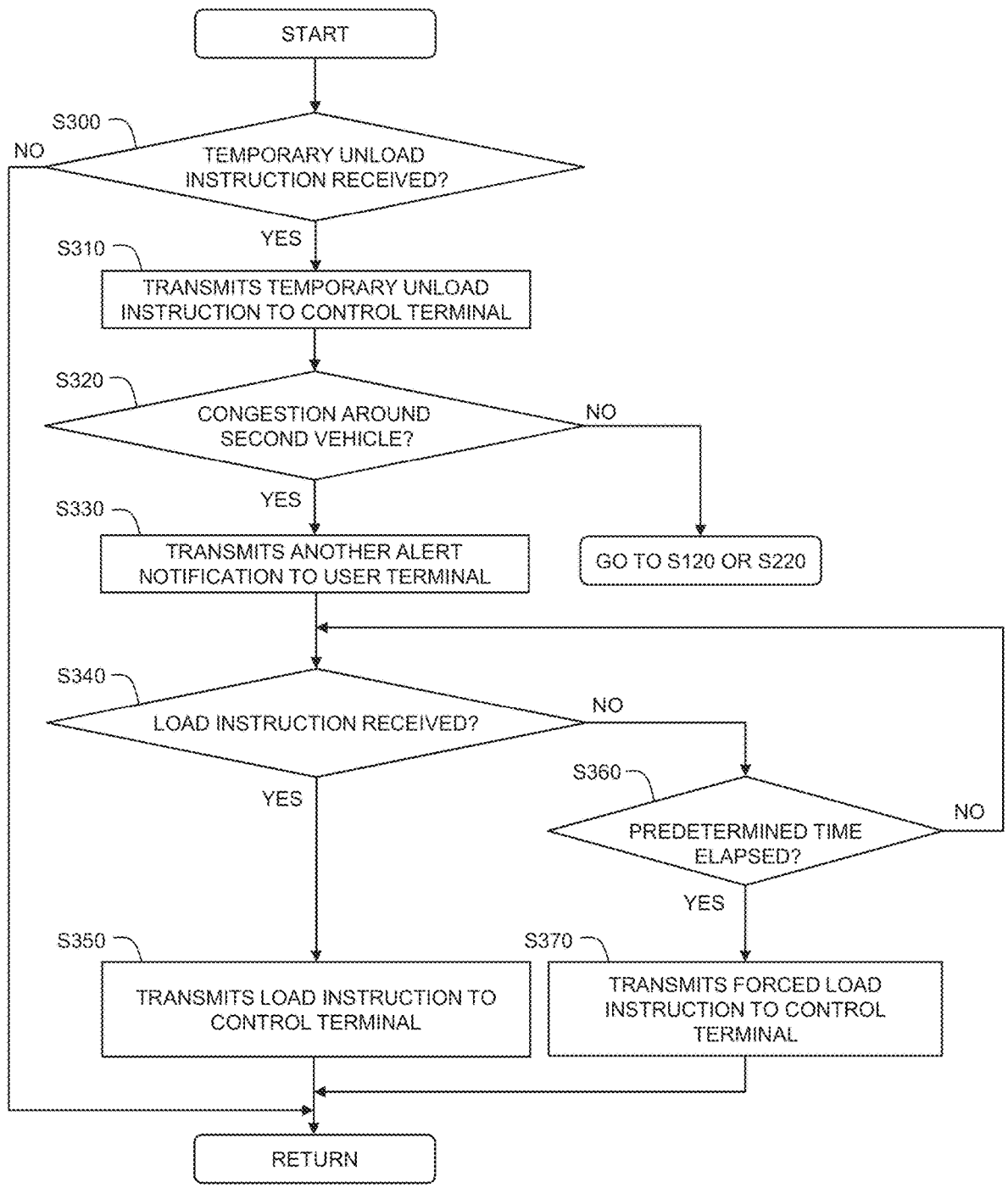
FIG. 5 is a flowchart illustrating a process example of the load and unload support device according to the third embodiment.

FIG. 5 is a flowchart illustrating a process example of the information processing unit 10 in the load and unload support device 1 according to the third embodiment.

In step S300, the information processing unit 10 determines whether or not the temporary unload instruction of the second vehicle 3 is received. When it is determined that the temporary unload instruction of the second vehicle 3 is received (step S300; Yes), the processing proceeds to step S310. Otherwise (step S300; No), the processing is terminated.

In step S310, the information processing unit 10 transmits the temporary unload instruction for the second vehicle 3 to the control device 6. Thereafter, the process proceeds to step S320.

In step S320, the information processing unit 10 determines whether or not the surroundings of the second vehicle 3 are congested. When it is determined that the surroundings of the second vehicle 3 are congested (step S320; Yes), the process proceeds to step S330. Otherwise (step S320; No), the process proceeds to step S120 or step S220.

In Step S330, the information processing unit 10 transmits the other alert notification to the user terminals 5. Thereafter, the process proceeds to step S340.

In step S340, the information processing unit 10 determines whether or not the load instruction for the second vehicle 3 has been received. If it is determined that a load instruction for the second vehicle 3 has been received (step S340; Yes), the process proceeds to step S350. Otherwise (step S340; No), the process proceeds to step S360.

In step S350, the information processing unit 10 transmits the load instruction for the second vehicle 3 to the control device 6.

In step S360, the information processing unit 10 determines whether or not a predetermined period of time has elapsed since the other alert notification was transmitted. In a case where it is determined that the predetermined time has elapsed since the other alert notification is transmitted (Yes in Step S360), the processing proceeds to Step S370. Otherwise (step S360; No), the processing returns to step S340.

In step S370, the information processing unit 10 transmits the forced load instruction of the second vehicle 3 to the control device 6.

4. Fourth Embodiment

In the load and unload support device 1 according to the third embodiment, when the surroundings of the second vehicle 3 are congested, the other alert notification is transmitted to the user terminal 5. However, the second vehicle 3 is kept waiting on the congested road 8 until the load instruction is received after the second vehicle 3 unloads. In this case, the waiting place of the second vehicle 3 may be changed from the congested road 8 to a non-congested road. Therefore, according to the load and unload support device 1 of the fourth embodiment, when the surroundings of the second vehicle 3 are congested at the time of temporary unload of the second vehicle 3, the waiting place of the second vehicle 3 is changed from the place set by the temporary unload instruction of the second vehicle 3 to another place. Hereinafter, a specific example of the load and unload support device 1 according to the fourth embodiment will be described.

Figure 6:
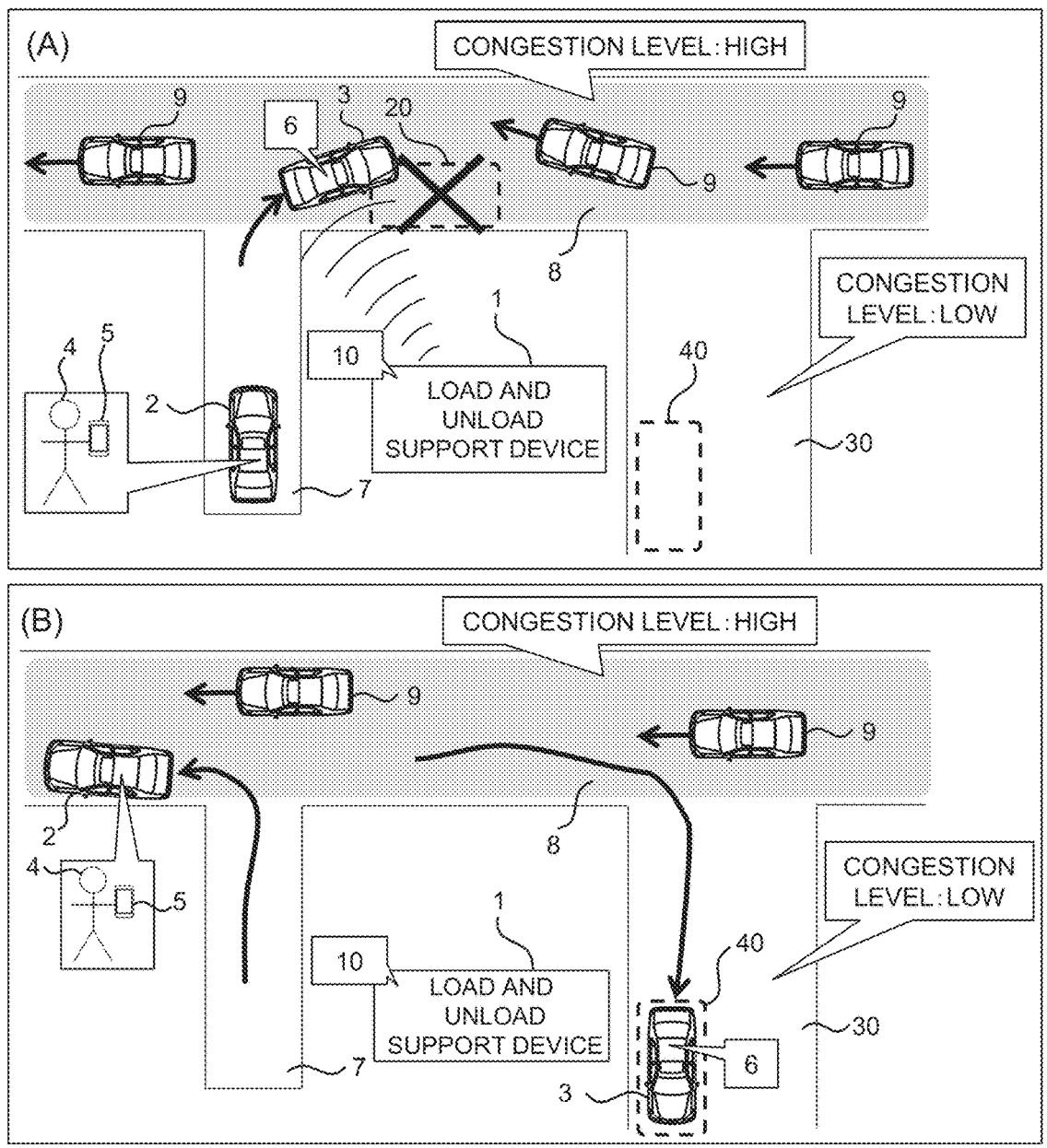
FIG. 6 is a diagram illustrating a specific example of a load and unload support device according to a fourth embodiment.

FIG. 6 is a diagram illustrating a specific example of the load and unload support device 1 according to the fourth embodiment. As illustrated in the case (A) of FIG. 6, when the surroundings of the second vehicle 3 are congested, the load and unload support device 1 changes the stop position 20 on the road 8 set by the temporary unload instruction of the second vehicle 3 to a stop position 40 on the road 30 having a low congestion level. The road 30 having a low congestion level means, for example, a road having a congestion level lower than a predetermined level.

Then, the load and unload support device 1 transmits a standby instruction to the control terminal 6 to wait at the stop position 40 on the road 30 with a low congestion level until the load instruction of the second vehicle 3 is given by the first vehicle 2. Thereafter, as illustrated in the case (B) of FIG. 6, the second vehicle 3 is caused to wait at the stop position 40 on the road 30 having a low congestion level in accordance with the wait instruction.

As described above, according to the load and unload support device 1 of the fourth embodiment, when the surroundings of the second vehicle 3 are congested at the time of temporary unload of the second vehicle, the waiting place of the second vehicle 3 is changed from the place set by the temporary unload instruction of the second vehicle 3 to another place. Thus, the second vehicle 3 can be prevented from stopping on the congested road 8 until the load instruction is received after the second vehicle 3 unloads. Therefore, the obstruction to the passage of the general vehicle 9 traveling on the road 8 is eliminated.

5. Fifth Embodiment

In the load and unload support device 1 according to the first embodiment, when the load instruction of the second vehicle 3 is not received until the predetermined time elapses after the temporary unload instruction of the second vehicle 3 is received, the alert notification is transmitted to the user terminal 5. In addition, in the load and unload support device 1 according to the third embodiment, when the surroundings of the second vehicle 3 are congested, the other alert notification for the user terminal 5 is transmitted before the alert notification is transmitted to the user terminal 5. However, the alert to the user 4 of the first vehicle 2 is not limited to the alert via the user terminal 5. For example, when the alert notification is transmitted to the user terminal 5, a notification device included in the second vehicle 3 may be operated to further notify the user 4 of the first vehicle 2 of a special alert that urges the second vehicle 3 to reload the vehicle. Examples of the notification device include a speaker, a light, and the like.

As described above, according to a load and unload support device 1 of the fifth embodiment, a notification instruction of the special alert to the user 4 of the first vehicle 2 is transmitted to the second vehicle 3. Thus, the user 4 of the first vehicle 2 who has forgotten to load the second vehicle 3 after unloading the first vehicle 2 can be prompted to reload the second vehicle 3. Therefore, it is possible to avoid a state where the second vehicle 3 remains on the road 8. Therefore, the obstruction to the passage of the general vehicle 9 traveling on the road 8 is eliminated.

What is claimed is:

1. A removal and retrieval support device for a first vehicle and a second vehicle parked in a parking lot used for parallel parking facing a road, the removal and retrieval support device comprising an information processing unit configured to communicate with a user terminal of the first vehicle and a control terminal of the second vehicle,
wherein at least the second vehicle is a vehicle configured for autonomous driving with removal and retrieval function,
wherein the information processing unit is configured to:
when the second vehicle is parked between an entrance/exit of the parking lot used for parallel parking connected to the road and the first vehicle, transmit a removal instruction for the second vehicle that is received from the user terminal to the control terminal and temporarily moves the second vehicle from the parking lot used for parallel parking by autonomous driving;
when receiving a retrieval instruction for the second vehicle from the user terminal subsequent to a receipt of the removal instruction, transmit the retrieval instruction for the second vehicle to the control terminal for moving the second vehicle into the parking lot used for parallel parking by autonomous driving; and
when a predetermined time elapses after the receipt of the removal instruction without receiving the retrieval instruction for the second vehicle, transmit an alert notification to the user terminal.

2. The removal and retrieval support device according to claim 1,
wherein the information processing unit is configured to transmit a forced retrieval instruction for the second vehicle to the control terminal, when a predetermined time elapses after transmitting the alert notification to the user terminal without receiving the retrieval instruction from the user terminal.

3. The removal and retrieval support device according to claim 1,
wherein the information processing unit is further configured to transmit another alert notification to the user terminal before transmitting the alert notification to the user terminal, when surroundings of the second vehicle that has been temporarily moved from the parking lot used for parallel parking by autonomous driving in accordance with the removal instruction are congested.

4. The removal and retrieval support device according to claim 3,
wherein the information processing unit is further configured to transmit the forced retrieval instruction for the second vehicle to the control terminal, when a predetermined time elapses after transmitting the other alert notification to the user terminal without receiving the retrieval instruction from the user terminal.

5. A removal and retrieval support method for a first vehicle and a second vehicle parked in a parking lot used for parallel parking facing a road,
wherein at least the second vehicle is a vehicle configured for autonomous driving with removal and retrieval function,
wherein the removal and retrieval support method comprising:
when the second vehicle is parked between an entrance/exit of the parking lot used for parallel parking connected to the road and the first vehicle, transmitting a removal instruction for the second vehicle that is received from a user terminal of the first vehicle to a control terminal of the second vehicle and temporarily moves the second vehicle from the parking lot used for parallel parking by autonomous driving;
when receiving a retrieval instruction for the second vehicle from the user terminal subsequent to a receipt of the removal instruction, transmitting the retrieval instruction for the second vehicle to the control terminal for moving the second vehicle into the parking lot used for parallel parking by autonomous driving; and
when a predetermined time elapses after the receipt of the removal instruction without receiving the retrieval instruction for the second vehicle, transmitting an alert notification to the user terminal.

* * * * *